United States Patent [19]

Idlani et al.

[11] Patent Number: 5,156,439
[45] Date of Patent: Oct. 20, 1992

[54] RECLINER MECHANISM FOR A SEAT ASSEMBLY HAVING AN ECCENTRIC PIVOT PIN

[75] Inventors: Sundeep B. Idlani, Westland; William M. Huffman, Jackson, both of Mich.; Richard L. Fesmire, Lexington, Tenn.

[73] Assignee: Hoover Universal, Inc., Plymouth, Mich.

[21] Appl. No.: 744,388

[22] Filed: Aug. 13, 1991

Related U.S. Application Data

[63] Continuation-in-part of Ser. No. 681,960, Apr. 8, 1991, abandoned.

[51] Int. Cl.⁵ .............................................. B60N 2/02
[52] U.S. Cl. .................................... 297/367; 297/355; 403/282; 74/409
[58] Field of Search ................. 297/367, 366, 355; 475/170; 74/440, 409; 403/282, 345

[56] References Cited

U.S. PATENT DOCUMENTS

| | | | |
|---|---|---|---|
| 4,118,134 | 10/1978 | Mansel | 403/282 |
| 4,376,333 | 3/1983 | Kanamaru et al. | 403/282 X |
| 4,593,952 | 6/1986 | Berghof | 297/363 X |
| 4,762,366 | 8/1988 | Bauer et al. | 297/367 |
| 4,795,213 | 1/1989 | Bell | 297/367 |
| 4,872,726 | 10/1989 | White et al. | 297/367 |
| 4,943,116 | 7/1990 | Ohwada et al. | 74/409 X |

FOREIGN PATENT DOCUMENTS 2605522 8/1977 Fed. Rep. of Germany ...... 297/367

OTHER PUBLICATIONS

Product Engineering, F. Gutmann, Oct. 26, 1959, Example 2, p. 72, "18 Ways To Control Backlash In Gearing".

Primary Examiner—Kenneth J. Dorner
Assistant Examiner—Milton Nelson, Jr.
Attorney, Agent, or Firm—Harness, Dickey & Pierce

[57] ABSTRACT

A recliner mechanism for a seat assembly is disclosed in which the seat back is pivotally mounted to the seat cushion by an eccentric pivot pin which enables the location of the seat back pivot point to be adjusted during assembly. The seat back forms a sector gear meshing with a pinion gear on a seat cushion as part of the recliner mechanism. By adjusting the position of the seat back pivot point, backlash between the sector gear and pinion gear can be eliminated.

7 Claims, 4 Drawing Sheets

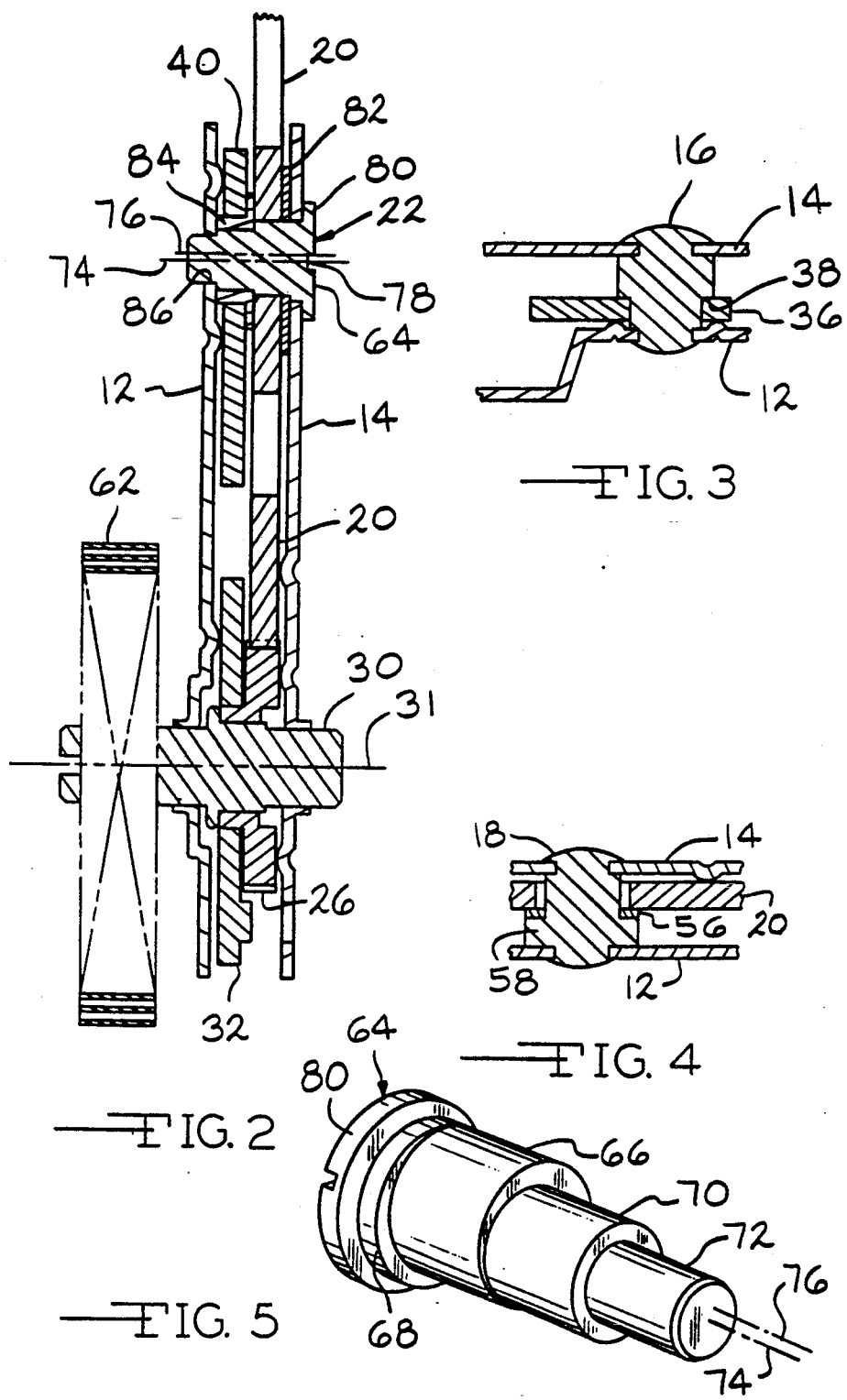

RECLINER MECHANISM FOR A SEAT ASSEMBLY HAVING AN ECCENTRIC PIVOT PIN

CROSS REFERENCE TO RELATED APPLICATION

This application is a continuation-in-part of application Ser. No. 681,960, filed Apr. 8, 1991, abandoned Mar. 14, 1992.

BACKGROUND AND SUMMARY OF THE INVENTION

The present invention pertains to a recliner mechanism for a seat assembly having an eccentric pivot pin for the seat back to enable the position of the seat back pivot to be adjusted to eliminate back lash in the recliner mechanism gears.

Motor vehicle seat assemblies are often provided with a recliner mechanism to enable the seat back to pivot about a lateral axis to enable the angle of the seat back to be adjusted for comfort of the occupant. Furthermore, the front seat assembly of two door motor vehicle includes a seat back that can be rotated forward from its normal use position to a forward dump position to improve the accessibility to the area behind the front seat.

One recliner mechanism structure is operable with a seat back structure having a pair of arms extending downward along the two sides of the seat back that are pivotally connected to the lower seat frame. The seat back support arm on one side of the seat assembly typically has a plurality of gear teeth along a curved path concentric about the seat back pivot. The gear teeth form a sector gear and mesh with a pinion gear pivotally connected to the lower seat frame for rotation about an axis generally parallel to the axis about which the seat back rotates. The recliner includes a releasable lock mechanism to hold the pinion gear from rotation and, due to the meshing of the pinion gear teeth with the sector gear teeth, the seat back is thus locked in position. If desired, a sector gear and pinion gear can be provided on both sides of the seat back and connected to a common release lever to simultaneously release both sides of the seat back to adjust the seat back angle.

However, due to manufacturing variation in the production of the recliner mechanism components, the gear teeth do not always fully mesh with one another. As a result, there is backlash between the gears, resulting in a vibration and rattle of the seat back which can annoy vehicle occupants and produce customer complaints.

It is an object of the present invention therefore, to provide a means by which the backlash between the sector gear and pinion gear in a seat back recliner mechanism can be eliminated.

According to the present invention, one of the seat back or pinion gear pivots is formed with an eccentric pivot pin. During assembly, the eccentric pivot pin is rotated about its concentric axis so as to move one pivot toward or away from the other pivot until the pinion and sector gears are in a proper meshing relationship. Once the proper mesh is achieved, the eccentric pivot is secured to the lower seat frame to fix the position of the eccentric pivot.

It is a further object of the present invention to provide a method of securing the pivot pin to the lower seat frame in a manner that prevents rotation of the pivot over the life of the seat assembly.

It is a feature of the present invention to form the eccentric pivot as a rivet with the plain or tenon end of the rivet knurled. Once the pivot has been rotationally positioned, the knurled end of the rivet is upset using an orbital riveting process that forces the knurled teeth of the rivet into the seat frame to prevent rotation of the pivot.

Further objects, features and advantages of the invention will become apparent from a consideration of the following description and the appended claims when taken in connection with the accompanying drawings.

BRIEF DESCRIPTION OF THE DRAWINGS

FIG. 2 is a sectional view of the recliner mechanism as seen from substantially the line 2—2 of FIG. 1;

FIG. 3 is a fragmentary sectional view as seen from substantially line 3—3 of FIG. 1;

FIG. 4 is a fragmentary sectional view as seen from substantially line 4—4 of FIG. 1;

FIG. 5 is a perspective view of the eccentric pivot pin;

DETAILED DESCRIPTION OF THE INVENTION

Figure 1:
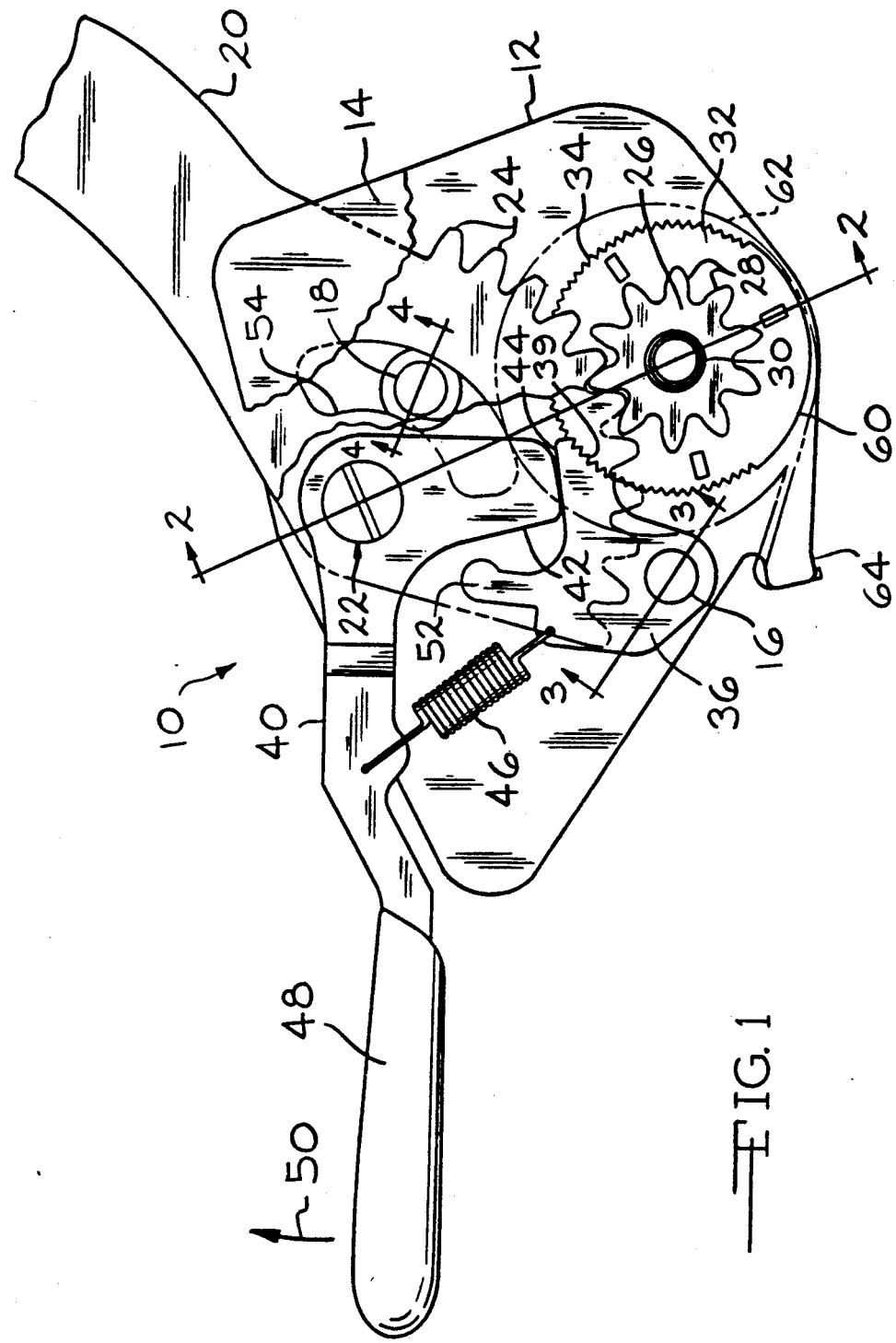
FIG. 1 is a fragmentary side view of the recliner mechanism of the present invention.

The recliner mechanism of the present invention is shown in FIG. 1 and designated generally at 10. Recliner mechanism 10 is disposed between and mounted to a pair of support plates, inboard plate 12 and outboard plate 14. The designations "inboard" and "outboard" are given merely to define relative location on a seat assembly and to distinguish one plate from the other and are not to be construed as limitations. The support plates are riveted together by at least two rivets 16 and 18. The support plates 12 and 14 are secured to a lower seat frame (not shown) and are used to pivotally mount the seat back frame to the lower seat frame. As such, the plates form a portion of the lower seat frame.

The seat back frame includes two downwardly extending seat back support arms 20 with one arm on each side of the seat assembly. The support arm 20 shown in FIG. 1 is on one side of the seat assembly and forms a part of the recliner assembly 10. Seat back support arm 20 is attached to the support plates at pivot 22 to enable the seat back to rotate relative to the lower seat cushion about an axis extending laterally across the seat assembly.

Recliner mechanism 10 is positioned along one side of the seat assembly to lock one seat back arm 20 in place to hold the seat back in position. If desired, a second recliner mechanism can be provided on the opposite seat side and a torsion bar or cable used to connect the two recliner mechanisms to simultaneously release both mechanisms upon actuation of a single release lever.

The seat back support arm 20 is formed with a plurality of teeth 24 in an arcuate path concentric about the pivot 22. The teeth 24 thus forms a sector gear on the lower portion of the seat back support arm 20. A pinion gear 26, having teeth 28, is fixed to a pivot pin 30 carried by the two support plates 12 and 14. The axis 31 of pivot pin 30 is generally parallel to the axis 74 of pivot 22 with both axes extending laterally of the seat assembly.

By locking the pinion gear 26 in place to prevent rotation, the seat back support arm 20 is held in position to prevent rotation of the seat back relative to the seat cushion. With a manually adjusted seat back recliner, a mechanical lock and release mechanism is provided to hold the pinion gear in place. Such a mechanical recliner mechanism is shown in the Drawing. However, if it is desired to provide a power seat adjusting mechanism, the pinion gear can be driven by an electric motor or other means to rotate the seat back relative to the seat cushion. The electric motor and drive means will be used to hold the pinion gear in place to prevent rotation of the seat back. The eccentric pivot of the present invention can be used with either a manual or a power recliner with equal effectiveness.

The manual mechanism shown in the drawing includes a locking gear 32 fixed to the pinion gear 26 or pivot pin 30 so that the locking gear and pinion gear rotate together about axis 31. A majority of the periphery of locking gear 32 is formed with teeth or serrations 34. A pawl 36 is rotatably mounted to the support plates 12 and 14 about the connecting rivet 16. The rivet 16 is formed with a shoulder 38 to position the pawl 36 laterally between the two support plates. The pawl 36 has a serrated portion 39 for engagement with the serrations 34 of the locking gear. When the pawl 36 is rotated into locking engagement with the gear 32, rotation of the locking gear and pinion gear is prevented. As a result of meshing of the sector gear teeth 24 with the pinion gear teeth 28, the seat back arm support 20 is fixed in position about pivot 22.

A release lever 40 having a cam 42 is also mounted for rotation about the pivot 22. The cam 42 engages a cam surface 44 of pawl 36 to force the pawl serrations into engagement with the locking gear. A biasing spring 46 coupled to the release lever 40 urges the cam 42 to rotate into engagement with the cam surface 44 of the pawl.

To release the seat back support arm 20, the release lever 40 is rotated clockwise by upward motion of the handle 48 in the direction of arrow 50. This causes the cam 42 to disengage cam surface 44 and contact the release arm 52 of pawl 36, rotating the pawl out of engagement with the locking gear. Doing so frees the pivot pin 30 for rotation about its axis, rotating the pinion gear 26 and consequently rotating the seat back support arm 20. When the seat back support arm 20 has been moved to a desired position, the handle 48 is released and spring 46 returns the release lever and cam to a position forcing the pawl to engage the locking gear to hold the seat back in place.

An arcuate slot 54 is formed in the seat back support arm 20 with the rivet 18 extending through the slot. The ends of slot 5 contact the rivet 18 to limit the travel of the seat back support arm 20 in each direction. A low friction washer 56 is placed between a shoulder 58 of rivet 18 and the seat back support arm 20 to ensure smooth, noise-free operation.

The locking gear 32 includes a peripheral portion 60 that is smooth, i.e., not including serrations 34. The smooth portion 60 is used when the seat back is rotated forward to a dump position. In the forward dump position, the serrations 39 of the pawl engage the smooth portion 60 of the locking gear and do not lock the gear 32 in place. This enables the seat back to be rotated rearwardly from the forward dump position without the necessity of first operating the handle 48. The locking gear 32 is free to rotate until the seat back is returned to its forwardmost locked position when the pawl will once again engage the serrations of the locking gear.

A clock spring 62 is coupled to the pivot 30 and to the support plate 12 at 64 to urge the pivot pin 30 to rotate in the proper direction to rotate the seat back forward when the pawl 36 is disengaged. To adjust the seat back position rearward, the seat occupant applies pressure to the seat back simultaneously with the release of the pawl to overcome the spring 62 and move the seat back rearward. To adjust the seat back forward, the seat occupant releases the pawl 36 and relieves pressure on the seat back allowing the spring 62 to rotate the seat back forward.

Because of manufacturing variation, the pinion gear teeth 28 and the sector gear teeth 24 are not always in a full mesh relationship with one another resulting in backlash between the sector and pinion gear teeth. As a result, the seat back is permitted to vibrate and rattle. The rattle can be a nuisance to vehicle occupants and can result in customer complaints. The vibration is particularly noticeable at the upper end of the seat back since the vibration is amplified by the length of the seat back from the pivot 22. Several components contribute to the manufacturing variation that affects the location of the pivots in the support plates, the size of the pinion gear and the sector gear as well as the size of the pivot pins.

To overcome the problems associated with the backlash between the sector gear and pinion gear, the pivot 22 is formed by a pivot pin 64 having an eccentric shoulder 66 for carrying the seat back support arm 20. The pivot pin 64 includes concentric shoulders 68, 70 and 72 that define the concentric pivot axis 74. The eccentric shoulder 66 defines an eccentric axis 76. It is the eccentric shoulder 66 upon which the sector arm 20 is rotated.

When the recliner mechanism is assembled, the pivot pin 64 is rotated by a tool placed in the slot 78 in the head 80 of the pivot pin. As the pivot pin is rotated about its concentric axis 74, the axis 76 of eccentric shoulder 66 is raised or lowered to move support arm 20, and hence the teeth 24 of the sector gear, either toward or away from the teeth 28 of the pinion gear. The pivot pin 64 is rotated until the gear teeth are in proper mesh at which time the shoulder 72 at one end of the pivot pin is staked, welded, upset or otherwise fastened to the support plate 12 to prevent further rotation of the pivot pin. As a result, back lash between the sector gear and the pinion gear is eliminated. A plastic anti-noise washer 82 is positioned between the seat back arm 20 and support plate 14.

The release lever 40 is carried by pivot pin 64 for rotation about the concentric shoulder 70 with a bushing 84 placed around the shoulder and between the release lever and seat back arm. Concentric shoulder 72 is seated through an aperture 86 in the inboard support plate 12.

Figure 6:
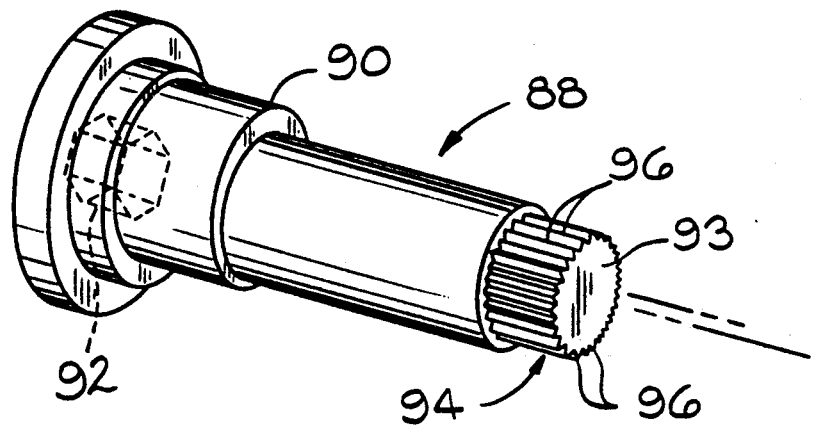
FIG. 6 is a perspective view of an alternative embodiment of the pivot pin of the present invention.
Figure 7:
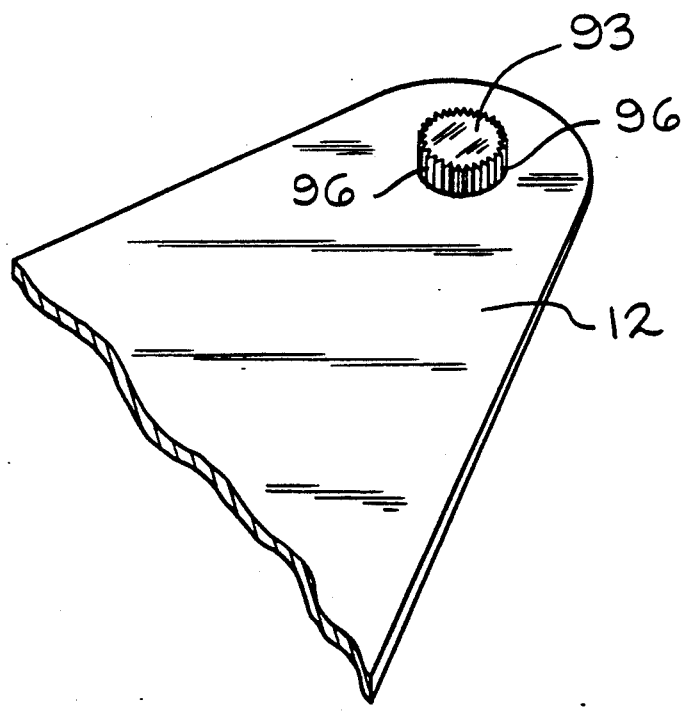
FIG. 7 is a perspective view of the pivot pin of FIG. 6 in assembly relation with the seat frame.
Figure 8:
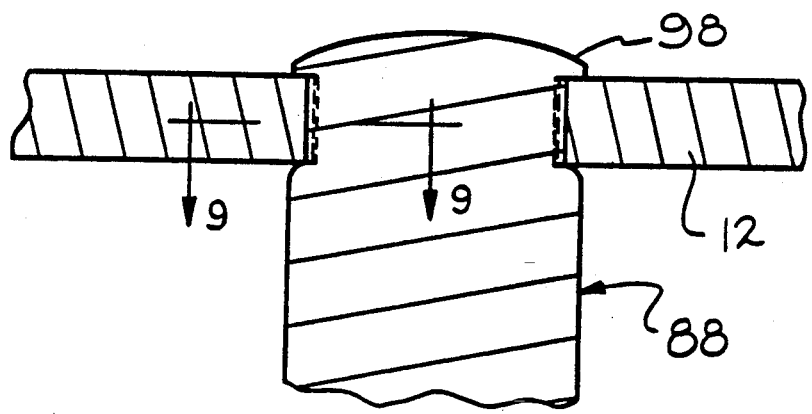
FIG. 8 is a side elevation view of the pivot pin shown in FIG. 7 after the plain end of the pivot has been upset forming a head.
Figure 9:
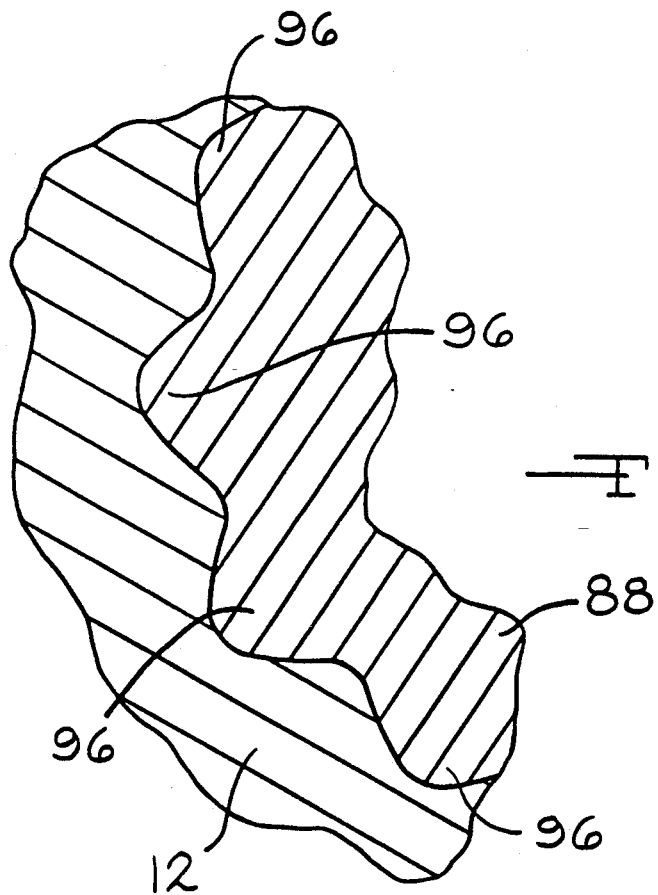
FIG. 9 is an enlarged sectional view as seen from substantially the line 9—9 of FIG. 8.

An alternative embodiment of the pivot pin 88 is shown in FIG. 6. Pin 88 includes an eccentric shoulder 90 similar to eccentric shoulder 66 on pivot pin 64. A hex socket 92 is provided in the enlarged end of pin 88 to enable rotation of the pin to position the eccentric shoulder where desired to provide proper mesh of the sector gear teeth with the pinion gear. The non-enlarged or tenon end 93 of the pin 88 includes a knurl 94 producing a plurality of radially extending teeth 96. When assembled, the tenon end 93 extends beyond the support plate 12 as shown in FIG. 7. The extending tenon end 93 is then upset by riveting to form a head 98 shown in FIG. 8 to secure the pivot pin to the support plates 12 and 14.

The knurl 94 is case hardened so that during the orbital riveting process, the teeth 96 are forced radially outward into the plate 12 forming grooves in the plate 12. The teeth 96 interlock with the plate 12 to prevent rotation of the pivot pin 88. Orbital riveting is the preferred process for forming the interlocking engagement of the teeth 96 with the plate. Any upsetting process can be used as long as the result is interlocking of teeth 96 with the plate 12. Once assembled, the position of the eccentric shoulder 90 will remain in the proper location to eliminate backlash between the sector gear teeth and the pinion gear teeth. Use of a knurled rivet with the orbital riveting process has proven to be a reliable means of securing the pivot pin to the support plates to prevent rotation. The eccentric pivot pins 64 and 88 are thus used to eliminate back lash between the sector gear teeth and the pinion gear teeth to prevent rattle and vibration of the seat back support arm 20.

It is to be understood that the invention is not limited to the exact construction and method illustrated and described above, but that various changes and modifications may be made without departing from the spirit and scope of the invention as defined in the following claims. One such modification would be to use the eccentric pivot pin for mounting the pinion gear rather than the seat back arm and then moving the pinion gear to mesh with the sector gear. The result of eliminating backlash would be the same.

We claim:

1. Recliner mechanism for a seat assembly comprising:
   a pair of spaced support plates;
   a seat back support arm pivotally mounted to said support plates about a first pivot, said seat back support arm having a sector gear portion;
   a pinion gear pivotally mounted to said support plates about a second pivot, the teeth of said pinion gear meshing with the teeth of said sector gear portion of said seat back support arm;
   means for locking said pinion gear to prevent rotation of said pinion gear about said second pivot whereby said seat back support arm is held in a fixed position about said first pivot;
   an eccentric pivot pin forming said first pivot, said eccentric pivot pin having a pair of spaced concentric shoulders mounting said pin to said support plates and defining a concentric axis and an eccentric shoulder defining an eccentric axis and mounting said seat back support arm whereby upon rotation of said pivot pin about the concentric axis, the eccentric axis and said seat back support arm are moved toward or away from said second pivot;
   means for securing said eccentric pivot pin to said support plates to prevent rotation of said eccentric pivot pin after said eccentric pivot pin has been rotated to place said sector gear portion of said seat back arm into proper mesh with said pinion gear; and
   means for releasing said lock means to enable said seat back support arm to be rotated about said first pivot, said release means including a handle pivotally mounted to said support plates by a concentric shoulder of said eccentric pivot pin.

2. The recliner mechanism of claim 1 wherein said securing means of said pivot pin includes a knurled portion at a tenon end of said pivot pin having a plurality of radially projected teeth, said knurled portion having a diameter to fit through an aperture in one of said support plates and said teeth being hardened whereby upon upsetting of said tenon end, said teeth are worked into said one support plate in locking engagement preventing rotation of said pivot pin relative to said support plates.

3. A recliner mechanism for a seat assembly, comprising:
   a pair of spaced support members;
   a seat back support arm mounted to said support members for rotation about a first pivot, said seat back support arm forming a sector gear having a plurality of teeth in an arcuate path generally concentric about said first pivot;
   a pinion gear having teeth meshing with the teeth of said sector gear, said pinion gear being mounted to said support members for rotation about a second pivot;
   a serrated locking gear coupled to said pinion gear for rotation therewith;
   a pawl rotatably mounted to said support members and having a serrated portion for engagement with said locking gear to hold said locking gear in place to prevent rotation of said locking and pinion gears;
   a cam carried by said first pivot and engaging said pawl for holding said pawl in locking engagement with said locking gear;
   a release lever operable to move said cam out of engagement with said pawl to enable said pawl to disengage said locking gear whereby said locking gear and pinion gear are freely rotated; and
   a pivot pin forming said first pivot having first and second concentric shoulders for mounting said pin to said support members and an eccentric shoulder carrying said seat back support arm whereby rotation of said pin about the axis of said concentric shoulders results in movement of the axis of said eccentric shoulder toward or away from said second pivot.

4. The recliner mechanism of claim 3 wherein said eccentric shoulder is disposed axially between said first and second concentric shoulders.

5. The recliner mechanism of claim 3 wherein said eccentric pivot pin has a third concentric shoulder upon which said release lever is rotatably carried.

6. The recliner mechanism of claim 3 wherein said eccentric pivot pin includes a radially extending flange at one end engaging one of said support members.

7. The recliner mechanism of claim 3 wherein said locking gear has a smooth peripheral portion without serrations engagable with said pawl in a non-locking relationship whereby said seat back support arm is free to rotate.

* * * * *